March 28, 1961  C. H. V. SAWYER ET AL  2,977,020
FLUID PRESSURE OVERLOAD RELIEF DEVICES
Filed May 25, 1959
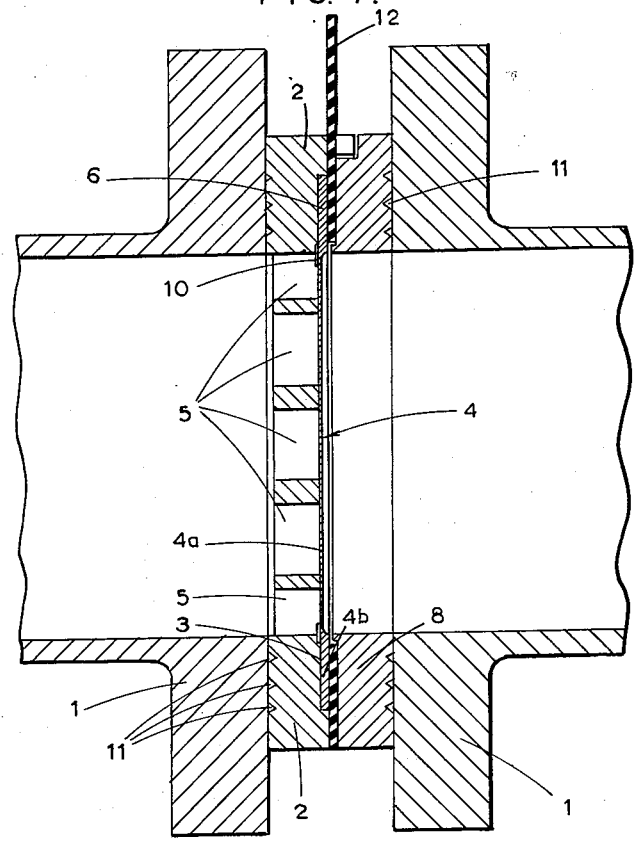
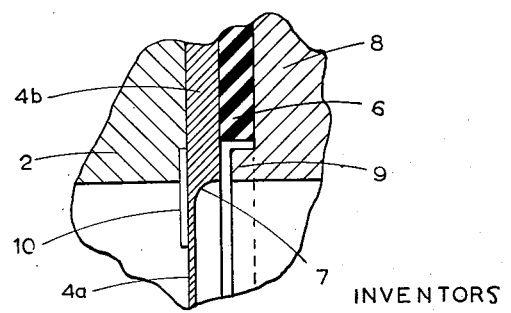
INVENTORS
CHARLES H.V. SAWYER
AND PETER E. LANDEG
BY
*william R. Lieberman*
ATTORNEY

2,977,020
FLUID PRESSURE OVERLOAD RELIEF DEVICES

Charles Henry Victor Sawyer and Peter Edmund Landeg, Hayes, England, assignors to C.D. Patents Limited, London, England, a British company Filed May 25, 1959, Ser. No. 815,611

Claims priority, application Great Britain June 4, 1958

7 Claims. (Cl. 220—89)

This invention relates to fluid pressure overload relief devices.

According to the invention, such a device comprises a main holder member which has a passage through which fluid can flow and is recessed to provide an annular seating, a non-ductile bursting disc such as of carbon or graphite which is flat on one side but which has on the other side an annular raised portion to which is secured an annular gasket, the said bursting disc fitting on the annular seating and normally closing the passage, and an annular holder member which fits on the gasket and has a locating ring engaged in the gasket.

The device is so located in its position of use that pressure is applied to the flat side of the disc, the application of a pressure overload bursting the disc into the recess. As the flat side is subjected to pressure, undesirable tensile stress concentration on the disc is avoided.

A preferred embodiment of the invention is illustrated in the accompanying drawings in which:

Figure 1 is a sectional diagram of a pipe joint, and

Figure 2 is an enlarged sectional view of part of the joint.

Referring to the drawings, a device for releasing fluid pressure overload is fitted in pipe-work of a pressure vessel between two adjacent flanged pipe ends 1, the device being of such a size that it can be fitted within the bolt circle of the pipe flanges.

The device comprises a main holder member 2 which may be a circular plate of carbon, metal or other suitable material. Opening on one face of the plate is a cylindrical recess 3 which provides an annular seating for the marginal portion of a face of a bursting disc 4. Leading from the bottom of the recess 3 is a number of holes or perforations 5 which extend through the remainder of the holder member 2 and together constitute a passage through which gas can flow, but which is closed when the bursting disc 4 is in position on the annular seating. The areas between the various holes or perforations provide a support for the disc 4 against a reversal of pressure.

The bursting disc 4 is of carbon and has one flat face 4a and the other face has an annular raised portion 4b. The marginal portion of the flat face is located on the annular seating. The thinner portion of the disc within the confines of the annular raised portion constitutes a membrane which ruptures when subjected to a given overload of pressure and the area occupied by this thinner portion is the bursting area of the disc. An annular gasket 6 is cemented on the face of the annular raised portion 4b. To prevent stress concentrations, the corner portion 7 between the raised portion 4b and the remainder of the disc is curved.

An annular holder member 8 made of carbon or metal or other material is seated on the bursting disc gasket 6 and has an internal locating ring 9 which fits just inside the inner edge of the gasket 6. This annular holder member 8 defines a passage of area about equal to that of the bursting area of the disc.

In order to prevent shear stress on the bursting disc when the pipe flanges are bolted together, the main holder member 2 is provided with a groove or second recess 10 which leads out of the first recess and surrounds the bursting area.

The faces of both holder members 2 and 8 remote from the disc are preferably formed with annular V-grooves 11 which assist in providing a gas tight seal with pipe flange gaskets.

The bursting disc gasket preferably has a locating tab or tabs 12 projecting edge-wise from it to engage in co-operating slots in the annular holder member. Discs designed to burst at different pressures can have their tabs arranged at different angles so that it is impossible to fit a disc in a holder which is intended for use at another bursting pressure.

The device according to the invention is primarily intended for use with low pressures, i.e. pressures below 20 pounds per square inch. When it is desired to construct a device for use with higher pressures, the main holder member 2 can be provided with a single passage extending over the entire bursting area as the bursting disc then used does not require a support against reversed pressure.

What we claim is:

1. A fluid pressure overload relief device comprising a main holder member which has a passage through which fluid can flow and a recess providing an annular seating and an outwardly extending annular border surrounding said recess; a bursting disc of a non-ductile material which is flat on one side, but which has an annular raised portion on the other side, said bursting disc fitting on said annular seating and closing said passage; an annular gasket secured on said annular raised portion; and an annular holder member which fits on said gasket, said gasket being sandwiched between said annular border and said holder member.

2. A fluid pressure overload relief valve comprising a main holder member in the form of a circular plate having a first recess providing an annular seating, an outwardly extending annular border surrounding said recess, a number of holes leading through the plate and together constituting a passage, and a second recess leading out of said first recess and surrounding said passage; a carbon bursting disc which is flat on one side but has an annular raised portion on the other side, said bursting disc fitting in said main holder member with the marginal portion of said flat side engaged on said annular seating; an annular gasket secured on said annular raised portion; and an annular holder member which fits on said gasket, said gasket being sandwiched between said annular border and said holder member.

3. An overload relief device in accordance with claim 1, wherein said annular holder member is provided with an annular locating ring engaged in said gasket.

4. An overload release device in accordance with claim 1, wherein said main holder has an annular recess formed therein underlying said bursting disc in alignment with the inner border of said raised portion thereof.

5. An improved bursting disc comprising a diaphragm formed of a non-ductile material, said diaphragm being planar on one face thereof and having an annular raised portion on the other face thereof, and a gasket secured to and overlying said raised portion and projecting outwardly from the outer edge thereof.

6. A bursting disc in accordance with claim 5, wherein the inner face of said raised portion joins the face of said diaphragm by way of a curved concave surface.

7. A bursting disc in accordance with claim 5, wherein said non-ductile material is carbon.

References Cited in the file of this patent

UNITED STATES PATENTS

| | | |
|---|---|---|
| 540,419 | Burlingame | June 4, 1895 |
| 2,224,748 | Sauer | Dec. 10, 1940 |
| 2,273,186 | Fischer | Feb. 17, 1942 |
| 2,276,830 | Doran | Mar. 17, 1942 |
| 2,553,267 | Nedoh | May 15, 1951 |
| 2,788,794 | Holinger | Apr. 16, 1957 |

FOREIGN PATENTS

| | | |
|---|---|---|
| 1,074,055 | France | Mar. 31, 1954 |